US008567520B2

(12) United States Patent
Wolf et al.

(10) Patent No.: US 8,567,520 B2
(45) Date of Patent: Oct. 29, 2013

(54) HANDHELD WORK APPARATUS

(75) Inventors: Günter Wolf, Oppenweiler (DE); Johannes Menzel, Wernau (DE); Maximilian Eberhardt, Esslingen (DE); Ulrich Kapinsky, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 241 days.

(21) Appl. No.: 13/064,072

(22) Filed: Mar. 4, 2011

(65) Prior Publication Data

US 2011/0226501 A1 Sep. 22, 2011

(30) Foreign Application Priority Data

Mar. 19, 2010 (DE) ......................... 10 2010 011 986

(51) Int. Cl.
*F16F 7/116* (2006.01)

(52) U.S. Cl.
USPC .................................... 173/162.2; 173/162.1

(58) Field of Classification Search
USPC ........................................... 173/162.2, 162.1
See application file for complete search history.

(56) References Cited

U.S. PATENT DOCUMENTS

| | | | | |
|---|---|---|---|---|
| 4,371,043 | A * | 2/1983 | Kubokawa | 173/162.2 |
| 4,776,408 | A * | 10/1988 | Elkin et al. | 173/211 |
| 5,697,456 | A * | 12/1997 | Radle et al. | 173/162.2 |
| 6,375,171 | B1 * | 4/2002 | Zimmermann et al. | 267/137 |
| 6,446,421 | B1 * | 9/2002 | Kramer et al. | 56/233 |
| 6,799,642 | B2 | 10/2004 | Wolf et al. | |
| 7,270,320 | B2 * | 9/2007 | Menzel et al. | 267/175 |
| 7,412,959 | B2 * | 8/2008 | Wolf et al. | 123/198 E |
| 7,942,212 | B2 * | 5/2011 | Zimmermann | 173/162.1 |
| 8,225,514 | B2 * | 7/2012 | Guip et al. | 30/381 |
| 2002/0104665 | A1 * | 8/2002 | Wolf et al. | 173/162.2 |
| 2008/0276469 | A1 * | 11/2008 | Guip et al. | 30/383 |
| 2009/0095497 | A1 * | 4/2009 | Zimmermann | 173/162.2 |
| 2011/0240324 | A1 * | 10/2011 | Kondo et al. | 173/162.2 |
| 2012/0073144 | A1 * | 3/2012 | Tamura et al. | 30/272.1 |
| 2012/0160532 | A1 * | 6/2012 | Kurzenberger et al. | 173/162.2 |

* cited by examiner

*Primary Examiner* — Brian D Nash
(74) *Attorney, Agent, or Firm* — Walter Ottesen P.A.

(57) ABSTRACT

A handheld work apparatus includes a drive motor (28) to drive a tool and at least one handle (3) as well as at least one anti-vibration element (9) that includes a coil spring (10). The coil spring (10) is operatively connected to the handle (3) at one end and with the drive motor (28) at the other end. The anti-vibration element has a tear-off guard (29) which extends through the anti-vibration element (9). A centering element (21) is arranged on the tear-off guard (29) to avoid, in a simple manner, that the tear-off guard moves radially outwards.

18 Claims, 4 Drawing Sheets

HANDHELD WORK APPARATUS

CROSS REFERENCE TO RELATED APPLICATION

This application claims priority of German patent application no. 10 2010 011 986.5, filed Mar. 19, 2010; the entire content of which is incorporated herein by reference.

BACKGROUND OF THE INVENTION

U.S. Pat. No. 6,799,642 B2 discloses a handheld work apparatus having an anti-vibration element which includes a tear-off guard. A holder of the tear-off guard is held in the slot by a housing part. Fixation by means of a housing part is not always easily possible because, for example, in the case of plastic housing parts the demolding directions must be taken into account. Because the ledge on the housing partially projects into the coil spring, the mounting direction is predefined. Thus, the ledge can be fixed on the housing only in the case of special installation situations.

SUMMARY OF THE INVENTION

It is an object of the invention to provide a handheld work apparatus whose anti-vibration element has a simple configuration and can be mounted easily.

The handheld work apparatus of the invention includes: a drive motor; at least one handle; at least one anti-vibration unit having a coil spring having first and second ends; the coil spring being operatively connected to the handle at the first end and with the drive motor at the second end; the anti-vibration unit having a tear-off guard which extends through the anti-vibration unit; and, a centering element arranged on the tear-off guard.

Because the centering element is arranged on the tear-off guard itself, no special configuration of the housing, on which the anti-vibration element is fixed, is necessary. This results in a simple configuration. Because the centering element is arranged on the tear-off guard, the mounting direction is not predetermined thereby.

A simple configuration results when the centering element is cylindrical. The diameter of the cylinder can be smaller than the height of the cylinder so that a cylindric shape of the centering element results, or it can be larger than the height of the cylinder so that a disc-like shape of the centering element results. Advantageously, the outer diameter of the centering element is at least approximately 60% and at most approximately 100% of the inner diameter of the coil spring. In particular, the outer diameter of the centering element is slightly smaller than the free inner diameter of the coil spring so that the centering element does not affect the dampening or hardly affects the dampening. The centering element is large enough to prevent the tear-off guard from falling radially outwards in the slot and thereby causing damage to the coil spring or the plug under corresponding load. It can also be desirable, however, to have additional damping effects through the centering element in radial and/or axial directions. In this case, the outer diameter and/or the length of the centering element are to be chosen to correspond to the desired damping effect. The centering element can fully fill up the free interior space of the coil spring. Mounting of the centering element under pretension can also be advantageous.

The width of the centering element, which is measured in the direction of the longitudinal axis of the coil spring, advantageously corresponds approximately to one to ten times the pitch of the coil spring. Thus, support of the centering element on the inner periphery of, the coil spring can be ensured. With a comparatively small width of the centering element, dampening in the axial direction of the coil spring can be ensured which is essentially unhindered by the centering element. Advantageously, a centering element having a large width will be chosen if a dampening effect via the centering element is desired. In this connection, the width of the centering element can be larger than the free interior space of the coil spring, so that the centering element is held under pretension between the fixing elements of the coil spring.

Advantageously, the centering element is made of elastic material. The elastic material is, in particular, a foamed plastic, advantageously foamed polyurethane. With foamed plastic such as in particular foamed polyurethane, good centering can be achieved at a low weight. At the same time, clattering of the centering in the coil spring is prevented, and in the case of very large relative movements between the handle and drive motor, the centering element can additionally add a dampening effect. Advantageously, the centering element is movably supported on the tear-off guard in the longitudinal direction of the tear-off guard. The configuration is simplified thereby. In particular, the centering element has a mounting slot for fixation on the tear-off guard. Thus, the centering element can be slipped on the tear-off guard in a simple manner.

Advantageously, the coil spring is supported by a fixing element on at least one end. For fixing the tear-off guard, it is advantageously provided that the fixing element has a slot which runs radially outward in relation to the longitudinal center axis of the coil spring. The tear-off guard can be suspended in the slot in a simple manner, thus resulting in simple fixing of the tear-off guard. A simple configuration results when the fixing element is a plug which is screwed into the coil spring.

At least on one end, the tear-off guard advantageously has a holder which engages behind a wall section of the fixing element. Thus, the position of the tear-off guard is ensured in the axial direction of the coil spring.

The slot is closed radially outwardly in particular by the coil spring, so that any unintended disengagement of a holder is prevented by the construction. Advantageously, two fixing elements are provided each having a slot to receive the tear-off guard and being screwed onto the coil spring. Because the centering element is arranged on the tear-off guard, the centering element can secure the position of both holders in the slots. In this way, the centering element is arranged in particular between the fixing elements on the tear-off guard. Due to the inherent rigidity of the securing rope, a position securing device in the middle region of the securing rope is sufficient to prevent the holders in the slots from sliding radially outwards. In order to achieve additional dampening by the centering element, it is, in particular, provided that the width of the centering element corresponds to at least the distance of the fixing elements.

The tear-off guard advantageously includes a fixedly connected securing rope at whose end the holder is fixed. In particular, the securing rope is a steel rope which has a high strength at a comparatively low weight.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
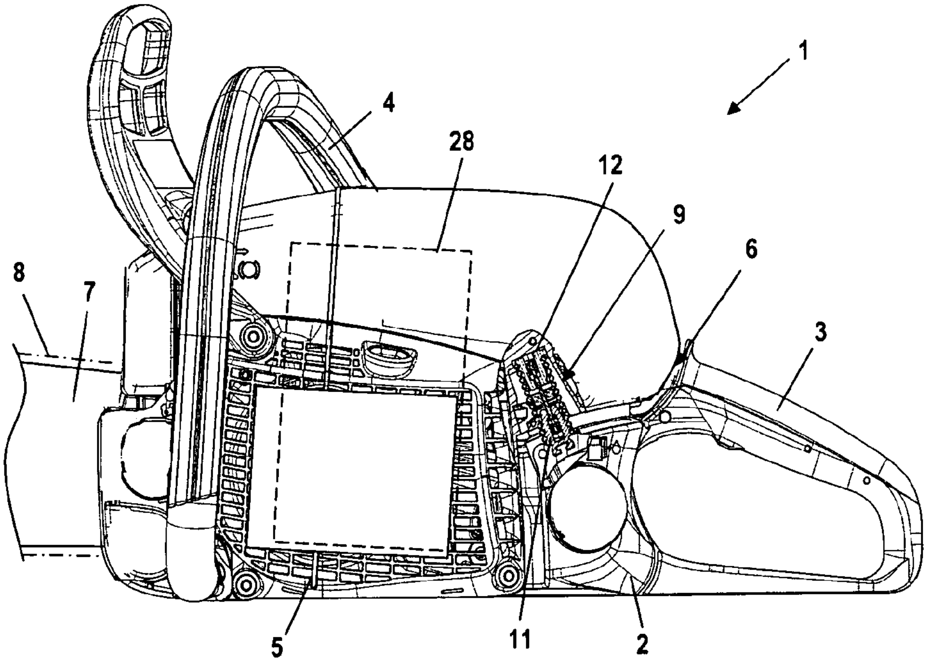
FIG. 1 is a schematic side elevation view of a motor saw.

FIG. 1 shows a motor saw 1 as an example embodiment of a handheld work apparatus. The proposed configuration of an anti-vibration element can also be advantageous in another handheld work apparatus, for example, a cut-.off machine, a brush cutter, or the like. The motor saw 1 has a handle housing 2 on which a rear handle 3 and a tubular handle 4 are fixed. The handle 4 reaches over a motor housing 5 formed separately from the handle housing 2 and connected thereto via a plurality of anti-vibration elements 9 which are shown in FIG. 1. A drive motor 28, advantageously a combustion engine, is provided in the motor housing 5. The drive motor 28 can also be an electric motor. A vibration gap 6 is provided between the motor housing 5 and the handle housing 2, which gap allows relative movements between the motor housing 5 and the handle housing 2. The anti-vibration element 9 projects over the vibration gap 6. The anti-vibration element 9 has a first plug 11 which is fixed to the handle housing 2, and a second plug 12 which is connected to the motor housing 5. The motor saw 1 has a guide bar 7 projecting forward on the end of the motor housing 5 which is opposite to the rear handle 3. A saw chain 8, shown schematically in FIG. 1, is arranged on the guide bar 7 on the periphery thereof. The saw chain 8 is driven by the drive motor 28.

Figure 2:
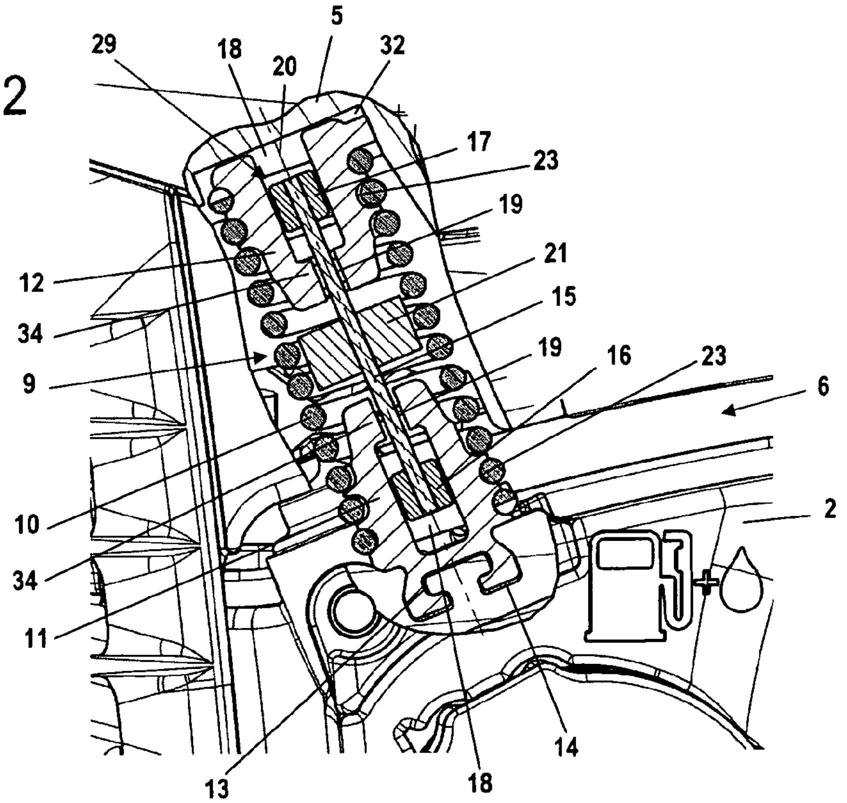
FIG. 2 shows an anti-vibration element of the motor saw of FIG. 1 in a partially cut-away view.

FIG. 2 shows the arrangement of the anti-vibration element 9 in detail. The anti-vibration element 9 has a coil spring 10. The plugs 11 and 12 are screwed into the two ends of the coil springs. For this, the plugs 11 and 12 have helical recesses 23 on their outer peripheries. As FIG. 2 shows, the outer diameter of the recess 23 decreases in the direction of the center of the coil spring 10 so that the coil spring 10 is guided with increased play with the distance increasing from its ends. Other fixing elements can also be provided instead of the plugs. The coil spring can also be fixed to the fixing element by means other than a threaded engagement.

The plug 11 screwed into the end of the coil spring 10 facing the handle housing 2 has a receptacle 14 for fixation on the handle housing 2, which engages about a guide 13 formed on the handle housing 2. The guide 13 has a T-shaped cross-section and is arranged in a recess on the handle housing 2. For securement in the longitudinal, direction of the guide 13, the plug 11 is screwed onto the handle housing 2 by means of a mounting screw, not shown here. The longitudinal axis of the mounting screw advantageously runs in the longitudinal direction of the guide 13.

The plug 12 which is screwed into the end of the coil spring 10 arranged at the motor housing 5 is arranged in a receptacle 32 on the motor housing 5 and is attached to the motor housing 5 by means of a mounting screw which is also not shown.

As FIG. 2 shows, the coil spring 10 is traversed by a tear-off guard 29 which includes a securing rope 15 that runs in the direction of the longitudinal center axis of the coil spring 10. The securing rope 15 is a rigid rope, in particular a steel rope. Holders (16, 17), whose outer diameters are larger than that of the rope, are fixed at the ends of the securing rope 15. A centering element 21 is arranged on the securing rope in the area between the plugs 11 and 12. The centering element 21 is made of plastic. In the embodiment, the centering element 21 is formed of a foamed plastic, in particular foamed polyurethane. The configuration of the centering element 21 is described in more detail below. As FIG. 2 shows, the holders (16, 17) lie partially movably in the axial direction in sections 18 of the slots formed in the plugs (11, 12). The holders (16, 17) lie each behind wall sections 34 of the plugs 11 and 12. Upon breaking of the coil spring 10, the rear handle 3 can be withdrawn from the motor housing 5 until the holders 16 and 17 rest behind the wall sections 34 and thus effect a connection between the engine housing 5 and the handle housing 2.

Figure 3:
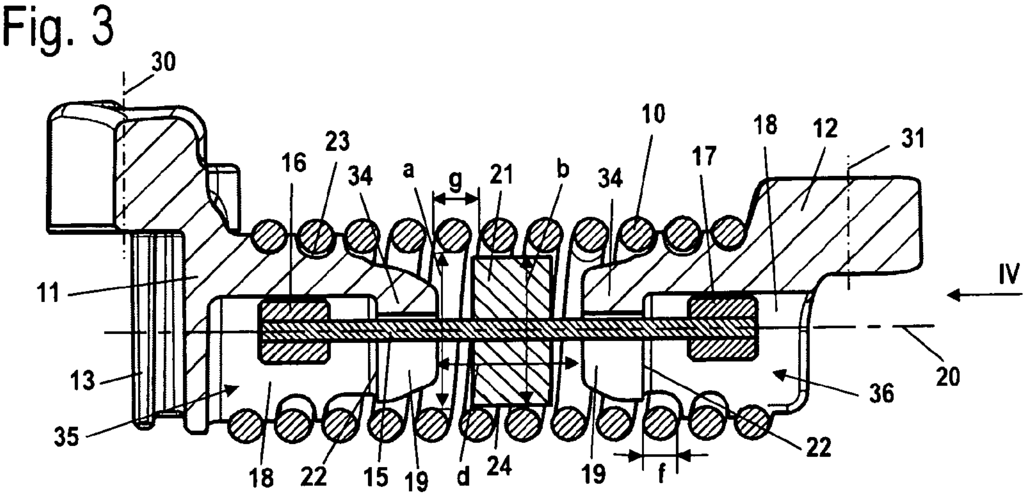
FIG. 3 shows a longitudinal section through the anti-vibration element of FIG. 2.

As FIG. 3 shows, the plug 11 has a slot 35 which is closed to the outside in the direction of the longitudinal center axis 20 of the coil spring 10. The slot 35 extends from the area of the longitudinal center axis 20 radially outwardly over the recess 23 for receiving the coil spring 10 and up to the outer periphery of the plug 11. The slot 35 is closed radially outwardly by the coil spring 10. As FIG. 3 shows in combination with FIG. 2, the slot 35 has section 18 in which the holder 16 is arranged and whose width approximately corresponds to the outer diameter of holder 16. A second, more narrow section 19 is arranged in the area of the wall section 34. The width of the slot 35 in the second section 19 is somewhat larger than the outer diameter of the securing rope 15.

A corresponding slot 36 is formed in the second plug 12. The slot 36 likewise has a first section 18 whose width approximately corresponds to the outer diameter of the holder 17 and a second section 19 in the area of wall section 34 which is somewhat wider than the diameter of the securing rope 15. The first section 18 in the second plug 12 is open in the direction of the longitudinal center axis 20 of the coil spring 10. The slot 36 is closed radially outwardly by the coil spring 10. As FIG. 3 shows, a support surface 22 for the holders (16, 17) is formed on each wall section 34 between the sections 18 and 19. FIG. 3 also shows the position of the mounting apertures for the plugs 11 and 12. The longitudinal axes 30 and 31 of the mounting screws for plugs 11 and 12 are shown as dot-dashed lines in FIG. 3. As FIG. 3 shows, the longitudinal axes 30 and 31 are parallel to each other so that assembly is possible in one direction.

As FIG. 3 shows, the slots 35 and 36 are aligned in the same direction and are congruent one above the other in the viewing direction of the longitudinal center axis 20 of the coil spring 10.

Figure 5:
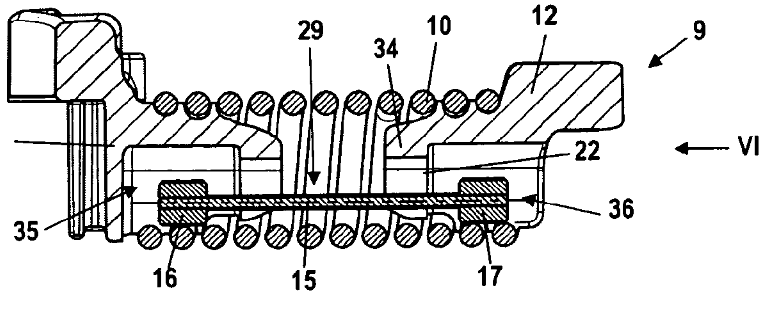
FIG. 5 shows an anti-vibration element according to the state of the art corresponding to the view of FIG. 3.
Figure 6:
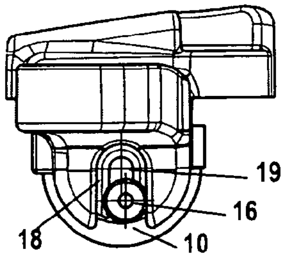
FIG. 6 is a side elevation view in the direction of arrow VI of FIG. 5.

FIGS. 5 and 6 show the tear-off guard 29 in known configuration without the centering element 21. Without the centering element 21, the tear-off guard 29 can slide radially outwardly in the slots 35 and 36 until the holders 16 and 17 rest against the inner periphery of the coil spring 10. Whenever load is applied to the anti-vibration element 9, the holders 16 and 17 can come to rest in the radially outer-lying portion of the support surface 22. This also follows from the side view in FIG. 6. In the case of unfavorable loads, this can lead to a breakage or fracture of the wall sections 34.

Figure 9:
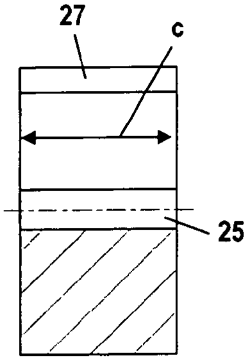
FIG. 9 shows a section along the line IX-IX of FIG. 8.

To avoid this, a centering element 21, shown in FIG. 3, is provided. The centering element 21 has an outer diameter (b)

which in the embodiment is somewhat smaller than the inner diameter (a) of the coil spring 10. Advantageously, the outer diameter (b) of the centering element 21 amounts to at least approximately 60% and at most approximately 100% of the inner diameter (a) of the coil spring 10. The centering element 21 extends over approximately two turns of the coil spring 10 in the direction of the longitudinal center axis 20 of the coil spring 10. The width (c) of the centering element 21, shown in FIG. 9, is significantly larger than the wire diameter (f) of the coil spring 10. Advantageously, the width (c) is about one to ten times the pitch (g) of the coil spring 10. Thus, it is ensured that the centering element 21 rests with its entire outer periphery 24 on at least one turn of the coil spring 10.

Figure 4:
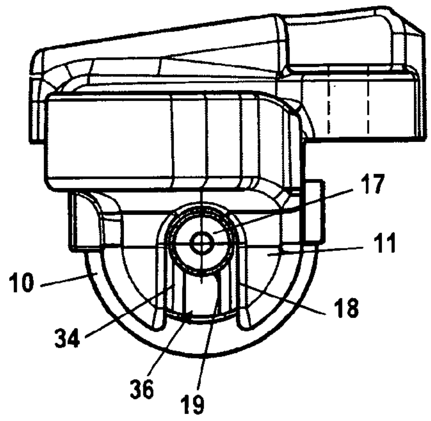
FIG. 4 is a side elevation view in the direction of arrow IV of FIG. 3.

The centering element 21 is arranged approximately centrally between the plugs 11 and 12 and is movably supported on the securing rope 15 Due to the relative movements during operation, an approximate centering of the centering element 21 on the tear-off guard 29 results during operation. As FIG. 3 shows, the holders 16 and 17 are supported by the centering element 21 on the ends of the securing rope 15 approximately at the groove base of the slots 35 and 36. A radially outward movement in the slots 35 and 36 is only possible in a very limited manner due to the rigid configuration of the securing rope 15. The position of the holder 17 in the slot 36 is also shown in FIG. 4.

Figure 7:
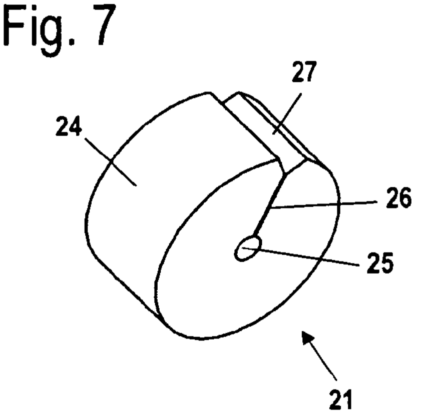
FIG. 7 is a perspective view of the centering element.
Figure 8:
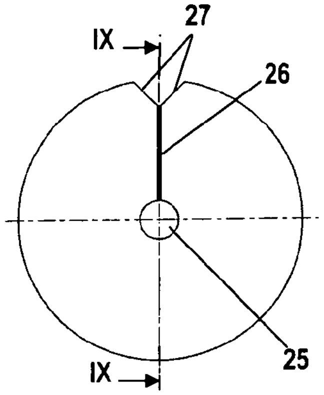
FIG. 8 is a side elevation view of the centering element of FIG. 7.

FIGS. 7 to 9 show the configuration of the centering element 21 in detail. The centering element 21 is formed approximately disc-shaped, that is, in the form of a flat cylinder; and centrally has an aperture 25 whose inner diameter approximately corresponds to the outer diameter of the securing rope 15. The aperture 25 is connected to the outer periphery 24 via a radially outward projecting mounting slot 26. Adjacent to the outer periphery 24, the mounting slot 26 has leading-in bevels 27 on both sides, so that the centering element 21 can be easily slid over the securing rope 15.

Figure 10:
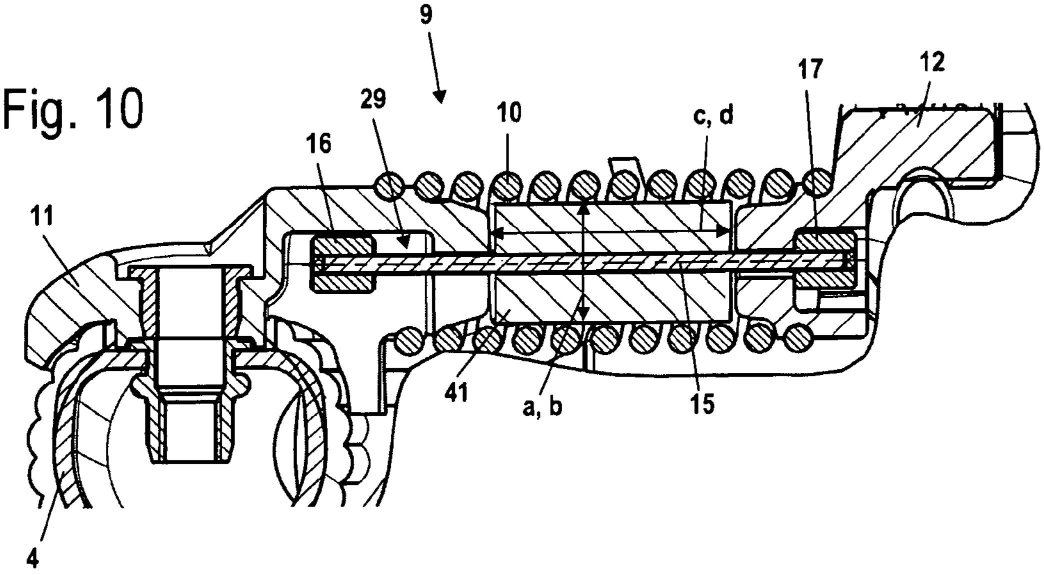
FIG. 10 shows a longitudinal section through an embodiment of a anti-vibration element; and, FIG. 11 is a partially cut away perspective view of the anti-vibration element of FIG. 10.
Figure 11:
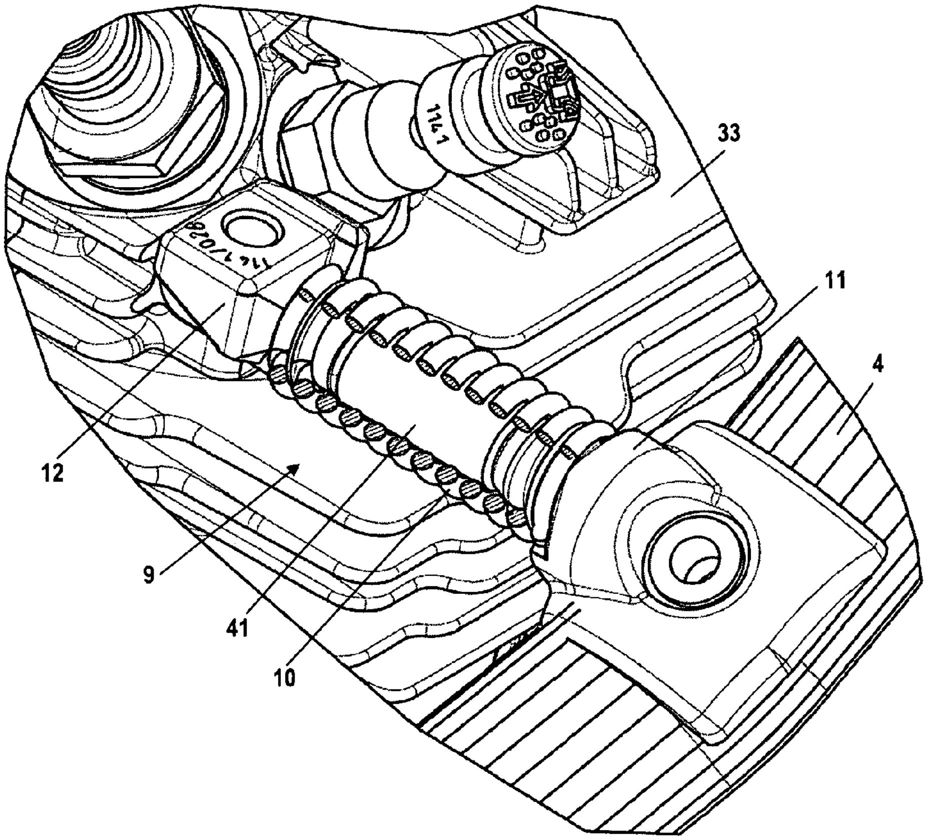

A further embodiment of an anti-vibration element 9 is shown in FIGS. 10 and 11. The reference characters correspond to the same elements as in the previous FIGS. The anti-vibration element 9 has a centering element 41 which is supported on the securing rope 15 of the tear-off guard 29 and is configured cylindrically. The centering element 41 essentially fills up the receptacle defined by the plugs 11 and 12 and the coil spring 10.

In the embodiment according to FIGS. 10 and 11, the width (c) of the centering element 41 corresponds to at least the distance (d) between the plugs 11 and 12. When the width (c) is larger than the distance (d), the centering element is arranged between the plugs 11 and 12 under pretension. The outer diameter of the centering element 41 corresponds to at least the inner diameter (a) of the coil spring 10 and can also be larger than the inner diameter (a), so that the centering element 41 is also pretensioned in the radial direction. The width (c) of the centering element 41 is significantly larger than its outer diameter (b), so that a cylindrical configuration of the centering element 41 results.

As FIG. 11 shows, the anti-vibration element 9 is fixed with its one end at the handle 4 and with its other end at the cylinder 33 of the drive motor 28 which is configured as a combustion engine. The arrangement of the centering element 41 between the plugs 11 and 12 is illustrated in FIG. 11.

It is understood that the foregoing description is that of the preferred embodiments of the invention and that various changes and modifications may be made thereto without departing from the spirit and scope of the invention as defined in the appended claims.

What is claimed is:

1. A handheld work apparatus comprising:

a drive motor;

at least one handle;

at least one anti-vibration unit having a coil spring having first and second ends;

said coil spring being operatively connected to said handle at said first end and with said drive motor at said second end;

said anti-vibration unit having a tear-off guard which extends through said anti-vibration unit;

said anti-vibration unit including a fixing element for holding said coil spring at at least one of said first and second ends;

said fixing element having a slot which runs radially outward;

said tear-off guard being mounted in said slot; and, a centering element arranged on said tear-off guard to prevent said tear-off guard to slip radially outwardly in said slot.

2. The work apparatus of claim 1, wherein said centering element is configured cylindrically.

3. The work apparatus of claim 1, wherein:

said coil spring has an inner diameter (a); and, said centering element has an outer diameter (b) which is at least approximately 60% and at most approximately 100% of said inner diameter (a) of said coil spring.

4. The work apparatus of claim 1, wherein:

said coil spring has a pitch (g) and defines a longitudinal center axis;

said centering element has a width (c) measured in the direction of said longitudinal center axis of said coil spring; and, said width (c) of said centering element is approximately one to approximately ten times the pitch (g) of said coil spring.

5. The work apparatus of claim 1, wherein said centering element comprises an elastic material.

6. The work apparatus of claim 5, wherein said elastic material is a foamed plastic.

7. The work apparatus of claim 6, wherein said centering element comprises polyurethane.

8. The work apparatus of claim 1, wherein said centering element has a mounting slot for fixation on said tear-off guard.

9. The work apparatus of claim 1, wherein said fixing element is a plug which threadably engages said coil spring.

10. The work apparatus of claim 1, wherein said fixing element has a wall section; and, said tear-off guard has a holder on at least one end thereof which engages behind said wall section.

11. The work apparatus of claim 1, wherein two fixing elements are provided each having a slot for receiving said tear-off guard therein and being threadably engaged with said coil spring.

12. The work apparatus of claim 1, wherein said tear-off guard includes a securing rope.

13. The work apparatus of claim 12, wherein said securing rope is a steel rope.

14. The work apparatus of claim 1, wherein said fixing element has an outer periphery and a groove formed in said outer periphery for threadably receiving said coil spring therein; and, said slot extends through said groove to said outer periphery.

15. The work apparatus of claim 1, wherein said tear-off guard has a rigid configuration to limit a radially outward movement thereof in said slot.

16. A handheld work apparatus comprising:

a drive motor;

at least one handle;

at least one anti-vibration unit having a coil spring having first and second ends;

said coil spring being operatively connected to said handle at said first end and with said drive motor at said second end;

said anti-vibration unit having a tear-off guard which extends through said anti-vibration unit;

said anti-vibration unit including a fixing element for holding said coil spring at at least one of said first and second ends;

a centering element arranged on said tear-off guard;

said centering element being separate and apart from said fixing element; and, said centering element being held movably in the longitudinal direction of said tear-off guard on said tear-off guard.

17. A handheld work apparatus comprising:

a drive motor.;

at least one handle;

at least one anti-vibration unit having a coil spring having first and second ends;

said coil spring being operatively connected to said handle at said first end and with said drive motor at said second end;

said anti-vibration unit having a tear-off guard which extends through said anti-vibration unit;

said anti-vibration unit including fixing elements for holding said coil spring at respective ones of said first and second ends;

a centering element arranged on said tear-off guard; and, said centering element being arranged between said fixing elements on the tear-off guard.

18. The work apparatus of claim 17, wherein:

said centering element has a width (c);

said fixing elements are disposed at a distance (d) apart from each other; and, said width (c) of said centering element at least corresponds to said distance (d) of said fixing elements.

* * * * *